United States Patent
Lee et al.

(10) Patent No.: US 6,674,739 B1
(45) Date of Patent: Jan. 6, 2004

(54) DEVICE AND METHOD FOR ASSIGNING SPREADING CODE FOR REVERSE COMMON CHANNEL MESSAGE IN CDMA COMMUNICATION SYSTEM

(75) Inventors: Hyun-Seok Lee, Seoul (KR); Hi-Chan Moon, Seoul (KR); Soon-Young Yoon, Seoul (KR); Young-Ky Kim, Seoul (KR); Jin-Soo Park, Seoul (KR); Jae-Min Ahn, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/277,664

(22) Filed: Mar. 26, 1999

(30) Foreign Application Priority Data

Mar. 26, 1998 (KR) .......................... 98-10617
Apr. 13, 1998 (KR) .......................... 98-13150

(51) Int. Cl.[7] ............................... H04B 7/216
(52) U.S. Cl. ................ 370/342; 370/320; 370/335; 370/441
(58) Field of Search ................ 370/320, 335, 370/342, 441

(56) References Cited

U.S. PATENT DOCUMENTS

| | | | |
|---|---|---|---|
| 5,371,780 A | * 12/1994 | Amitay | 455/450 |
| 5,581,547 A | * 12/1996 | Umeda et al. | 370/342 |
| 6,049,535 A | * 4/2000 | Ozukturk et al. | 370/335 |
| 6,215,778 B1 | * 4/2001 | Lomp et al. | 370/335 |
| 6,269,088 B1 | * 7/2001 | Masui et al. | 370/335 |

FOREIGN PATENT DOCUMENTS

| | | |
|---|---|---|
| JP | 09-233051 | 9/1997 |
| WO | 9530289 | 11/1995 |
| WO | 9745966 | 12/1997 |

OTHER PUBLICATIONS

Japanese Office Action dated Apr. 15, 2003, issued in a counterpart application, namely, Appln. No. 2000-538453.

* cited by examiner

Primary Examiner—Nay Maung
Assistant Examiner—Edan Orgao
(74) Attorney, Agent, or Firm—Dilworth & Barrese, LLP

(57) ABSTRACT

There are provided a common channel message communicating device and method in a CDMA communication system. In a base station of the common channel message communicating device, a control message generator generates a control message including information representative of a spreading code for spreading a reverse common channel message, and a forward common channel transmitter transmits the control message on a forward common channel. In a mobile station, a control message analyser analyses information representative of an assigned spreading code included in the control message received on the forward common channel, a spreading code generator generates a spreading code based on the spreading code information, and a channel transmitter spreads the reverse common channel message by the spreading code and transmits the spread reverse common channel message.

72 Claims, 15 Drawing Sheets

DEVICE AND METHOD FOR ASSIGNING SPREADING CODE FOR REVERSE COMMON CHANNEL MESSAGE IN CDMA COMMUNICATION SYSTEM

BACKGROUND OF THE INVENTION

1. Field of the Invention

The present invention relates generally to the field of wireless communication, and more particularly to a device and method for transmitting a reverse common channel message on a channel temporarily designated as dedicated (collision-free channel) in a multimedia communication system.

2. Description of the Related Art

In a communication system based on the TIA/EIA/IS-95 standard, messages are communicated between a base station (BS) and a mobile station (MS) generally on a forward paging channel and a reverse access channel which are common channels before a voice call is set up. For communication with a mobile station without a dedicated channel connection, the base station must transmit a message on the paging channel and receives a response on the access channel. From the mobile's perspective, for communication with the base station without a dedicated channel connection, the mobile station transmits a message on the access channel and receives a response on the paging channel. There can be a plurality of paging and access channels. Each paging channel is distinguished by a unique Walsh code, and each access channel by a long code generated with an access channel long code mask.

FIGS. 1A and 1B illustrate message transmissions between a base station and a mobile station on common channels. Referring to FIG. 1A, when the base station transmits a control message on a paging channel, a corresponding addressed mobile station transmits a response message on an access channel. If the mobile station transmits a control message on the access channel, the base station transmits a response message to the mobile station on the paging channel. Referring to FIG. 1B, the mobile station sends an access channel message to the base station on the access channel after message exchange.

The conventional access channel communication method is suitable for processing a voice call with light traffic. If mobile stations sharing the same long code simultaneously transmit messages on the access channel, a message contention occurs, resulting in a loss of the messages. This mechanism is referred to as contention-based random access.

Upon such a message contention for the access channel, a mobile station should resume an attempt to transmit a message on the access channel. In this case, each mobile station transmits a message on the access channel using its assigned long code, and if the contention occurs, it perceives the message occurrence in a predetermined time and resumes a message transmission after a randomized time delay. The mobile station performs an initial attempt to access the base station at a predetermined power level. When it fails to receive an acknowledgement from the base station, it performs the next attempt at a power level a specified amount higher than the previous attempt. If repeated attempts to access the access channel for predetermined times turn out failures, the procedure starts again at the lowest predetermined power level. Information is transmitted on the access channel in access channel slots and access channel frames.

FIG. 8 describes a message transmission procedure on an access channel from a mobile station. The entire process of sending one message and receiving (or failing to receive) an acknowledgement for that message is called an access attempt. Each transmission in the access attempt is called an access probe. Access probes are a series of transmissions of progressively higher power used when a mobile first attempts to access the system. Each access probe is comprised of a preamble and a message capsule. Within an access attempt, access probes are grouped into access probe sequences. Each access probe sequence includes a predetermined number (Max_Probe_No) of access probes, and the entire access attempt is comprised of a predetermined number (Max_Sequence_No) of access probe sequences. The first access probe of each access probe sequence is transmitted at an initial, relatively low power level. Each subsequent access probe is transmitted at a progressively higher power level than the previous access probe. The time interval RS between access probe sequences is determined by a random function. The time interval TA+RT between access probes of an access probe sequence is also generated by a random function. After transmitting each access probe, the mobile station waits a predetermined period TA to receive an acknowledgement from the base station. If an acknowledgement is received, the access attempt ends successfully. If no acknowledgement is received, the next access probe is transmitted after a random time RT.

In the above long code sharing scheme for common channels, the mobile station uses a Hash function to determine a long code among all available long codes (access channel long codes) in its initialization state, so that all mobile stations fairly share the long codes for access channels. In order to assign mobile station classes, an average of an initial attempt time and a next attempt time is adjusted.

Depending upon whether data service is MS originated or BS originated, there are two types of messages sent on the access channel, i.e., a message sent autonomously by the mobile station and a response message which is a response to a base station (i.e., paging channel) message. The two messages are treated logically at an equal level. Both the MS initiated message and the page response message are transmitted using access channel long codes determined with the Hash function by the mobile station.

The transmission rate of the access channel is fixed in the conventional communication system. In accordance with the IS-95 standard, an access channel message is generated in accordance with upper layer and physical layer protocols. In addition, a message is spread by an access channel long code determined by the mobile station.

However, the mechanism of accessing common channels for data service in a conventional communication system has the following problems:

(1) Random access—Because an access channel is acquired by the contention based random access, message transmissions with the same long code are likely to cause message contention, leading to message losses. When message contention occurs, a mobile station re-transmits a message on the access channel after a predetermined and randomized period. It is not possible to estimate the time required for acquisition of the access channel thereby increasing an average message transmission time, the variation of the transmission time, and power consumption of the mobile station;

(2) Long code sharing—The equal assignment of available long codes for common channels to mobile stations makes it impossible to control an individual probability of access channel contention for each mobile station. It is desirable, therefore, to apply different procedures of common channel access determined by the mobile station's data requirements. That is, a mobile station entering a relatively less time-constrained data communication should have a different procedure of common channel access than a mobile station processing real time data like moving pictures. To do this, long codes should be assigned to the latter in such a way that it allows rapid access to a common channel, however, the conventional equal long code distribution method cannot afford this special data service;

(3) Mobile station class assignment—It is impossible to assign mobile station classes in accessing a common channel because a contention probability cannot be controlled when the mobile stations is to use an access channel;

(4) A distinction cannot be made between control message initiating parts (MS initiation and BS initiation). That is, it is impossible to determine whether an access channel request priority should be given to a response message for a base station message over a message autonomously generated from a mobile station, or vice versa;

(5) A mobile can typically be classified by service priority, however, because of equal treatment of response messages for BS initiated messages, classes cannot be assigned to them; and (6) The fixed transmission rate of the access channel: increases the transmission time of a long message on the access channel. The resulting increase in an access channel occupying time in turn increases the contention probability.

SUMMARY OF THE INVENTION

An object of the present invention, as embodied and broadly described herein, is to provide a device and method for communicating on common channels in a communication system, which can reduce the transmission delay of the common channels and increase the transmission efficiency thereof to support data service.

Another object of the present invention is to provide a common channel accessing device and method in a communication system, in which user classes are assigned depending on user data types in data communication.

A further object of the present invention is to provide a device and method for processing BS initiated data with a priority over MS initiated data in a communication system.

Still another object of the present invention is to provide a device and method for continuously transmitting a common channel message exceeding a one-time transmissible length on a designated specific common channel.

Yet another object of the present invention is to provide a device and method for spreading a reverse common channel message for transmission by a code assigned by a base station in order to prevent message contention.

To achieve the above objects, there is provided a common channel message communicating device and method in a CDMA communication system. In a base station of the common channel message communicating device, a control message generator generates a control message including information representative of a spreading code for spreading a reverse common channel message, and a forward common channel transmitter transmits the control message on a forward common channel. In a mobile station, a control message analyzer analyzes information representative of an assigned spreading code included in the control message received on the forward common channel, a spreading code generator generates a spreading code based on the spreading code information, and a channel transmitter spreads the reverse common channel message by the spreading code and transmits the spread reverse common channel message.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 1A:
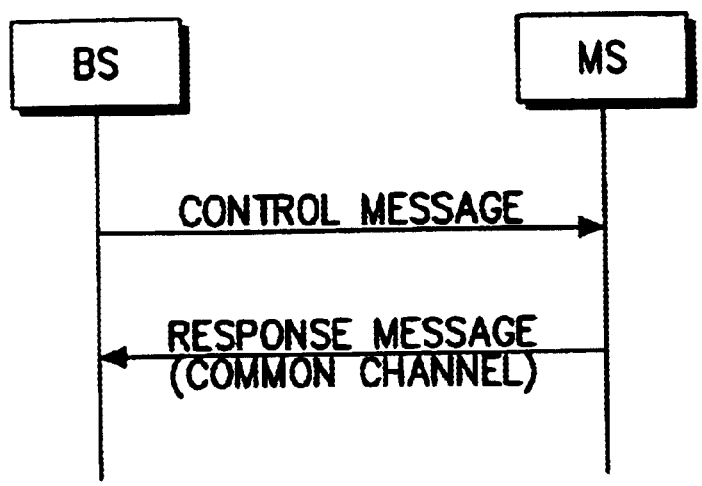
FIGS. 1A and 1B illustrate message exchanges in a conventional communication system.

The following description of the present invention is conducted with the appreciation that details including a long code for an access channel, service type, and time duration are provided for comprehensive understanding of the present invention. It is obvious to anyone skilled in the art that the present invention is easily achieved without the details or with modifications. While a description of an embodiment of the present invention is confined to a packet access channel which is a specific form of access channel, the present invention can be (partly) applied to a general access channel, for example, a circuit voice service in a conventional system.

Terms and Definitions

1. The term "data" as used herein is used in its widest sense covering, inter alia, packet data, circuit voice, and signaling.

2. A packet common channel is provided as a new common channel to accommodate rapid data transmission in a packet data communication of a communication system. The channel identification code of a packet access channel (i.e., a reverse packet common channel) is dynamically assigned to achieve high-speed data service. Here, the channel identification code is assumed to be a long code. The term "packet data" here refers to general data such as text as well as real time data like video data and voice. The packet common channel and the packet access channel will be broadly referred to as a common channel and an access channel, respectively, to include conventional (i.e., non-packet) access and common control channels.

Features

1. The transmission delay of a common channel is reduced for high speed packet data service. That is, in order to efficiently use resources in a high speed data service, a state transition occurs from a dedicated channel to a common channel whenever data is not transmitted for a predetermined time. The common channel is confined to short message service when a call is established between a base station and a mobile station for only voice processing. However, state transitions between the common channel and the dedicated channel occur frequently in the rapid packet data service. Therefore, the present invention provides a communication mechanism in which a message can be transmitted on the common channel with reduced transmission delay to implement rapid packet data communication in a highly dynamic state transition environment;

2. User classes are adjusted to control use of the common channel. In the rapid packet data service, various forms of data should be transmitted, including A) general data requiring real time processing relatively less but requiring high transmission reliability, B) voice which should be sent in real time but is relatively less significant in transmission reliability, and C) image information requiring real time processing and high transmission reliability. Therefore, to support the various forms of user data, the contention probability, bit rate, transmission delay of the common channel are individually controlled for each mobile station; and 3. Common channels are controlled differently for forward traffic and reverse traffic. Traffic from the base station to the mobile station is typically heavier that traffic from the mobile station to the base station in the rapid packet data service. For example, in the case where a WWW (World Wide Web) service is provided to a terminal user, a large amount of data for each page is transmitted from the base station to the mobile station, whereas a significantly smaller amount of data is directed from the mobile station to the base station. In view of this disparity, the common channel should be used to process BS initiated data with a priority over MS initiated data.

Packet Data Service States

Prior to describing the method of the present invention, packet data service states will be reviewed for a better understanding of the common channel.

Figure 2:
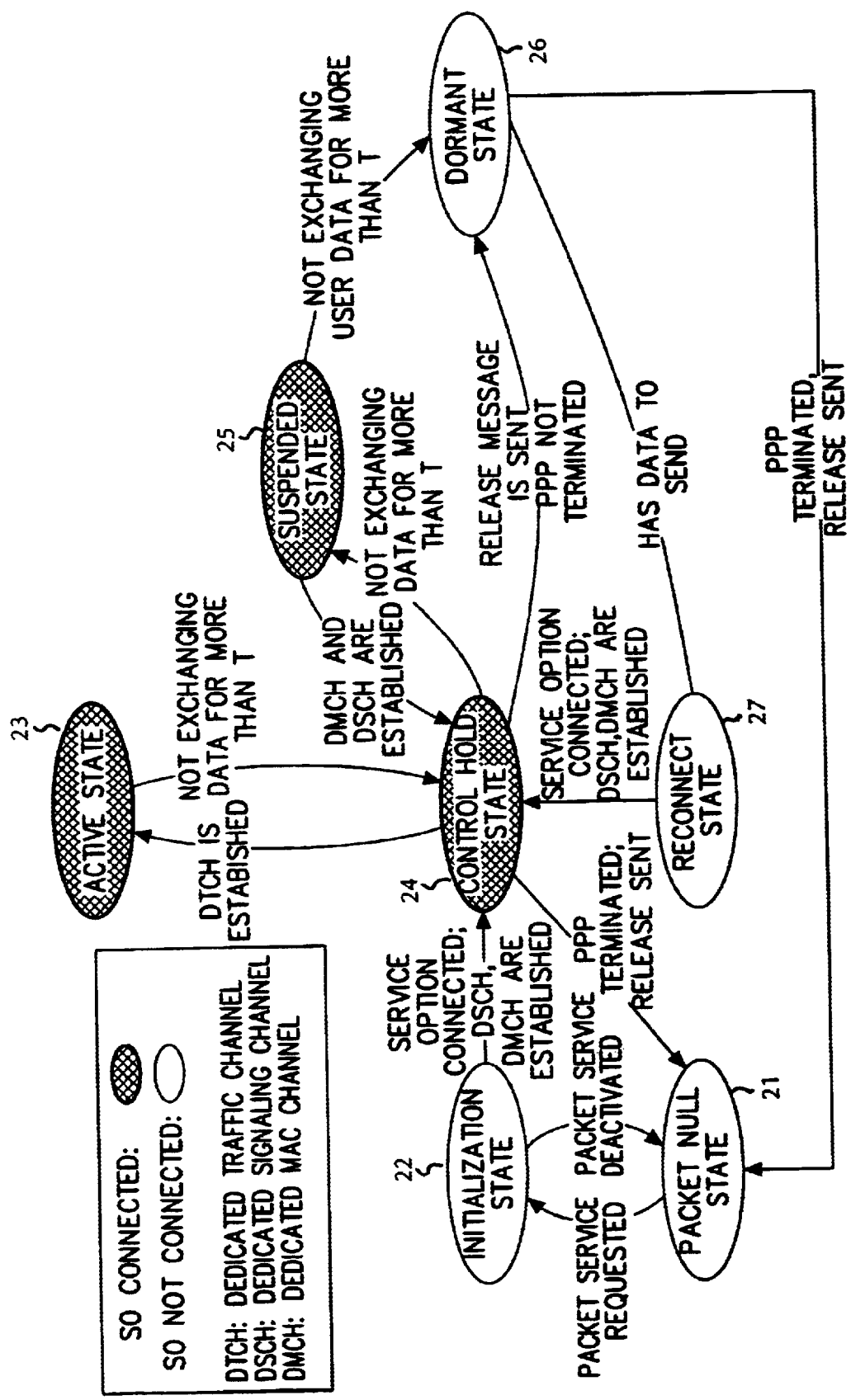
FIG. 2 is a packet service state transition diagram in a communication system.

FIG. 2 is a state transition diagram for packet service in a communication system in accordance with the prior art. Referring to FIG. 2, the packet service is comprised of a packet null state 21, an initialization state 22, an active state 23, a control hold state 24, a suspended state 25, a dormant state 26, and reconnect state 27. Packet service options are connected in the control hold state, active state, and suspended state. The packet null state is a default state before the packet service is activated.

Upon request for packet service in the packet null state, the initialization state is entered where a connection attempt for packet service is performed, and transition to the control hold state occurs if a dedicated control channel is established. The dedicated control channel is needed for initialization of RLP (Radio Link Protocol) and PPP (Point-to-Point Protocol). Then upon entering the active state, forward and reverse dedicated control channels and traffic channels are maintained, and RLP frames are communicated on these channels. If a relatively short inactive time period is set, the suspended state is entered to efficiently use radio resources and conserve power of the mobile station. In the suspended state, the dedicated channels are released but can be re-assigned in a relatively short time because both the base station and the mobile station retain status information including RLP state, traffic channel assignment, and encryption variables. If there is no data exchange for a predetermined time, the suspended state 25 transitions to the dormant state 26. In the dormant state 26, only the PPP connection is maintained and if transmit data is generated, the reconnect state 27 is entered. If the dedicated control channel is established, the reconnect state transitions to the control hold state 24. While the mobile station is in a common channel state such as the suspended, packet null, initialization, dormant, and reconnect states, it monitors a packet paging channel on a forward link. The packet paging channel will be generally referred to as a paging channel.

As described above, messages are transmitted on the common channels (i.e., paging channel and access channel) between the base station and the mobile station in the common channel states without dedicated channels established. The present invention provides a method of efficiently using an access channel on a reverse link, in common channel using states.

Figure 3A:
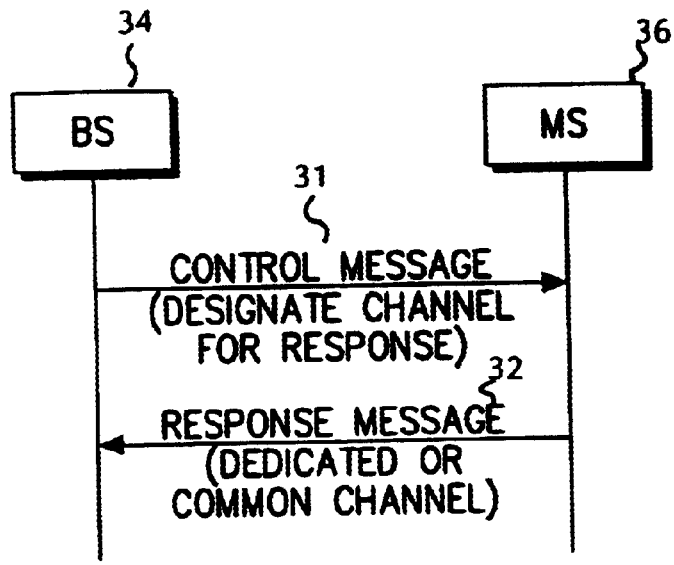
FIGS. 3A and 3B illustrate common channel message communication procedures between a base station and a mobile station according to an embodiment of the present invention.
Figure 3B:
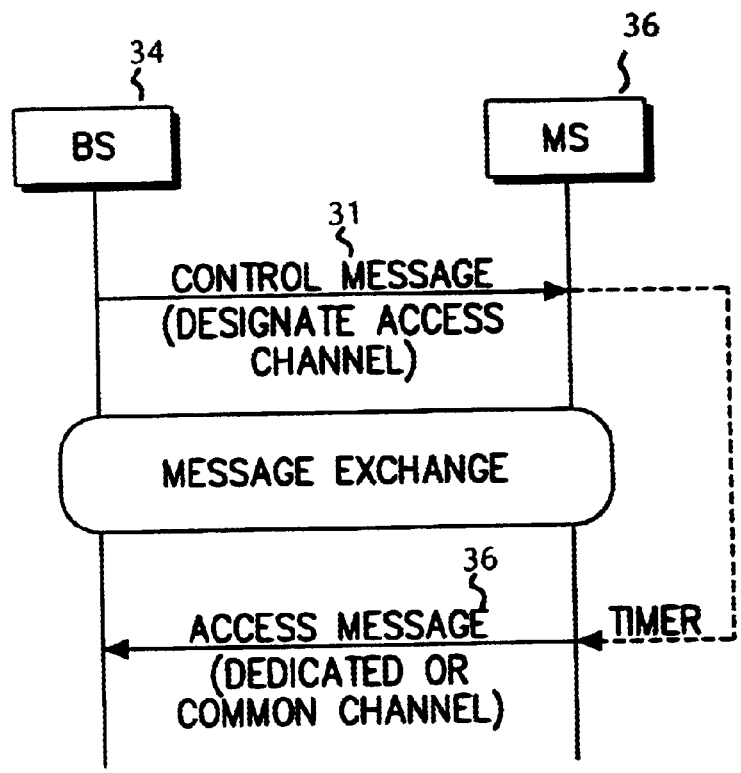

FIGS. 3A and 3B illustrate message transmissions on common channels between a base station 34 and a mobile station 36 according to an embodiment of the present invention. A forward control message 31 sent on a common channel includes access channel information needed for response or system access 32.

FIG. 3A illustrates an exemplary message exchange in the communication system of the present invention. When the base station 34 sends a control message 31 with long code information necessary for a response from the mobile station 36, the mobile station 36 sends the response message 32 to the base station on a dedicated or common channel corresponding to the long code assigned by the control message. FIG. 3B illustrates another exemplary message exchange in the communication system of the present invention. When the base station 34 sends a control message with long code information representing an access channel, the mobile station 36 sends an access message 36 to the base station on a dedicated or common access channel. If the control message contains long code duration information, the common channel of the assigned long code lasts until a timer set for the duration time expires.

Figure 1B:
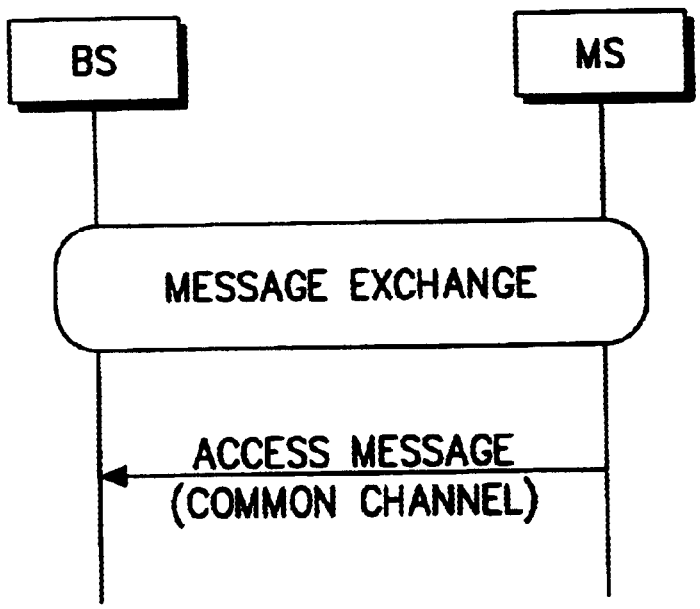

It should be noted that the communication system of the present invention supports conventional message exchange shown in FIGS. 1A and 1B as well as message exchange in accordance with the method of the present invention, as shown in FIGS. 3A and 3B.

Figure 4:
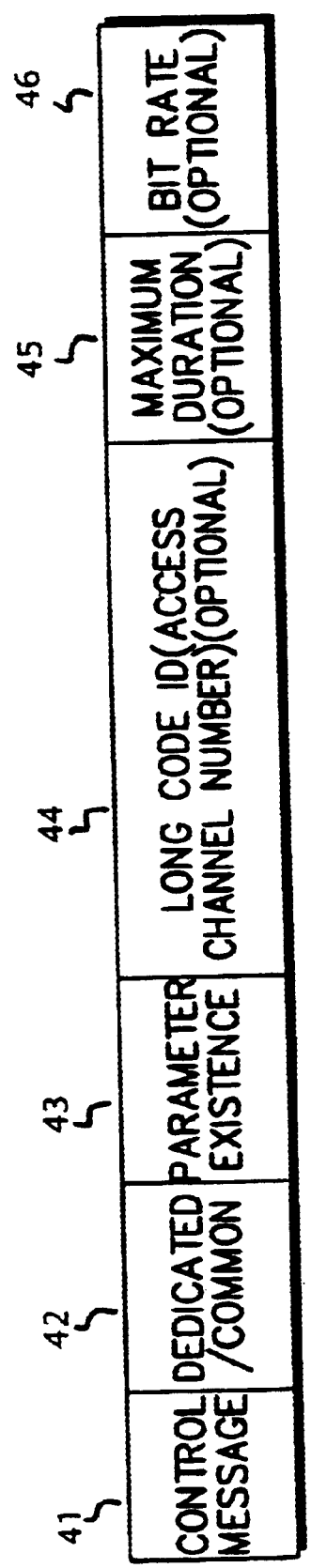
FIG. 4 illustrates a control message format on a forward link in a communication system according to the embodiment of the present invention.

FIG. 4 illustrates the format of a forward control message in accordance with the present invention. A control message field 41 contains information corresponding to the purpose of the control message, and a dedicated/common field indicates whether a reverse channel for transmitting a response message is designated as dedicated or common. The dedicated channel is a channel dedicated to one specific mobile station and the common channel is a channel shared by one or more mobile stations. A parameter existence field 43 indicates the presence or absence of optional fields in the control message. For example, if a one-bit or three-bit indicator is used for each field, a one in the first bit indicates the presence of a long code ID field, while zero in the first bit indicates the absence of the long code ID field. Similarly, the second bit and the third bit may indicate the presence or absence of a maximum duration field and of a bit rate field, respectively. Hence, reading a corresponding bit value in the parameter existence field enables the mobile station which receives the control message to determined whether each field exists The parameters in the control message of FIG. 4 are long code ID 44, maximum duration 45, and bit rate 46. The long code ID field is an optional field for designating a long code for the mobile station to send a response message. Since the access channel is identified by an access channel long code mask, designation of the long code means designation of an access channel number. The maximum duration field denotes a maximum time period for which an assigned long code can be maintained. That is, with the maximum duration given as T seconds, the mobile station can perform an access attempt on the access channel using the assigned long code for T seconds at maximum, and the base station also should operate a demodulator to receive the reverse channel spread by the long code within T seconds. The bit rate field is an optional field for setting a bit rate for a reverse channel on which to send a response or access message when a multi-bit rate is used.

Figure 5:
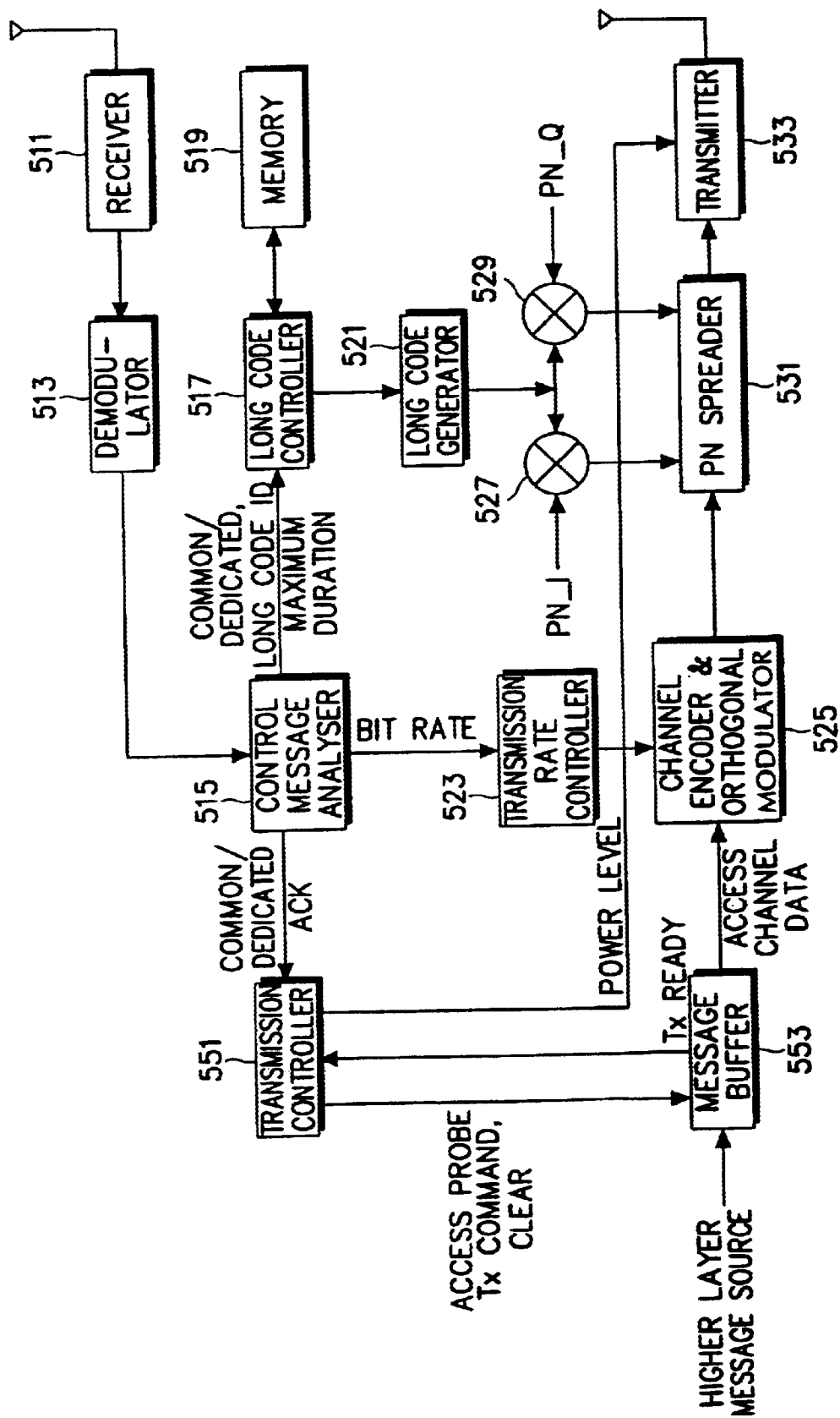
FIG. 5 is a block diagram of a mobile station for sending a common channel message in the communication system according to an embodiment of the present invention.

FIG. 5 is a block diagram of a mobile station for packet data communication according to an embodiment of the present invention. Referring to FIG. 5, a receiver 511 converts an RF (Radio Frequency) signal received through an antenna to a baseband signal. A demodulator 513 demodulates the base band signal received from the receiver 511 to an original signal. A control message analyzer 515 analyzes the fields of a control message, as shown in FIG. 4, received from the demodulator 513 and generates information for controlling communication on a corresponding common channel. The information output from the control message analyzer 515 includes bit rate, dedicated/common, long code ID, and maximum duration.

A transmission controller 551 receives the dedicated/common information on the common channel and an acknowledgement signal ACK from the control message analyzer 515, and determines a message transmission procedure according to the dedicated/common information. The transmission controller 551 sends a message buffer 553 an access probe transmit command (access probe Tx command) for accessing the access channel and outputs an access channel power level for a corresponding access probe number to a transmitter 533. The transmission controller 551 also generates a control signal for clearing the message buffer 553 upon receipt of the acknowledgement signal ACK.

The message buffer 553 stores a higher layer access channel message to send on the access channel, transmits the internally stored message each time the access probe transmit command is generated from the transmission controller 551, and clears the internally stored message upon generation of the clear signal from the transmission controller 551.

A transmission rate controller 523 receives the bit rate value from the control message analyzer 515 and generates a signal for controlling the transmission rate of data to be sent on the access channel. A memory 519 stores information on dedicated/common, long code ID, and maximum duration. A long code controller 517 receives the dedicated/common, long code ID, maximum duration information from the control message analyser 515, and determines a long code on the basis of the information received from the control message analyser 515 and the memory 519. A long code generator 521 generates the corresponding long code under the control of the long code controller 517. A time period for generating a long code is determined by the maximum duration information.

A channel encoder & orthogonal modulator 525 subjects the access channel data received from the message buffer 553 to encoding, repetition, and interleaving at the bit rate received from the transmission rate controller 523. The resulting access channel message (reverse common channel message) is then orthogonally modulated. Multipliers 527 and 529 multiply the long code received from the long code generator 521 by PN sequences PN_I and PN_Q, respectively, and generates PN sequences. A PN spreader 531 multiplies the orthogonally spread access channel signal by the I channel and Q channel spread sequences received from the multipliers 527 and 529. A transmitter 533 upconverts the spread access channel signal received from the PN spreader 531 to an RF signal for transmission.

In operation, the receiver 511 of the thus-constituted mobile station receives an RF signal, and the demodulator 513 demodulates the received signal through despreading and decoding and generates a control message. Then, the control message analyzer 515 extracts a dedicated/common value from the control message as shown in FIG. 4, determines whether there are a long code ID, a maximum duration value, and a bit rate by analyzing the contents of the fields, and extracts the values of the existent fields. The control message analyzer 515 sends the dedicated/common value and an acknowledgement signal ACK to the transmission controller 551, the dedicated/common, long code ID, and maximum duration values to the long code controller 517, and the bit rate value to the transmission rate controller 523.

Figure 8:
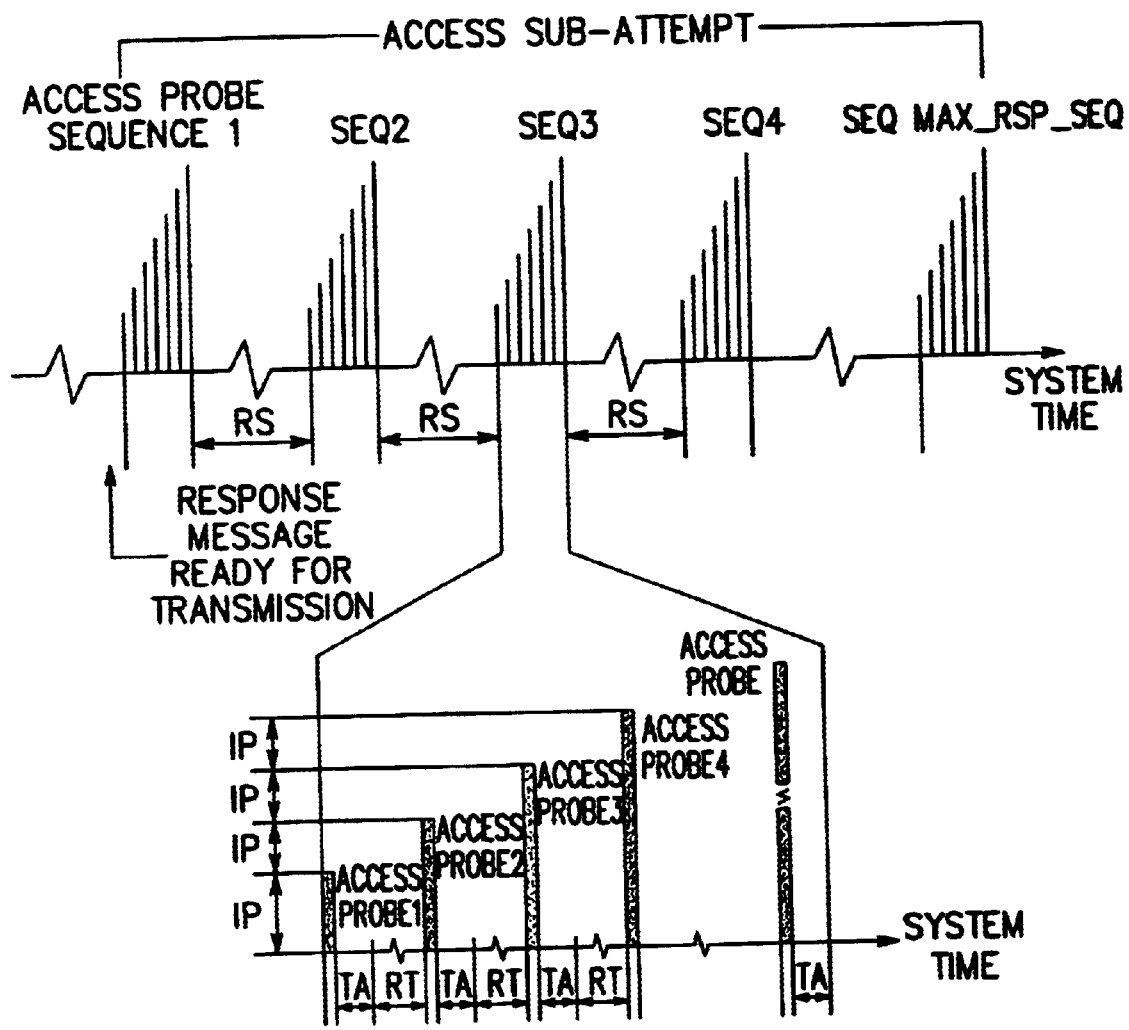
FIG. 8 illustrates a message transmission procedure on a common channel shared by a plurality of mobile stations.
Figure 9:
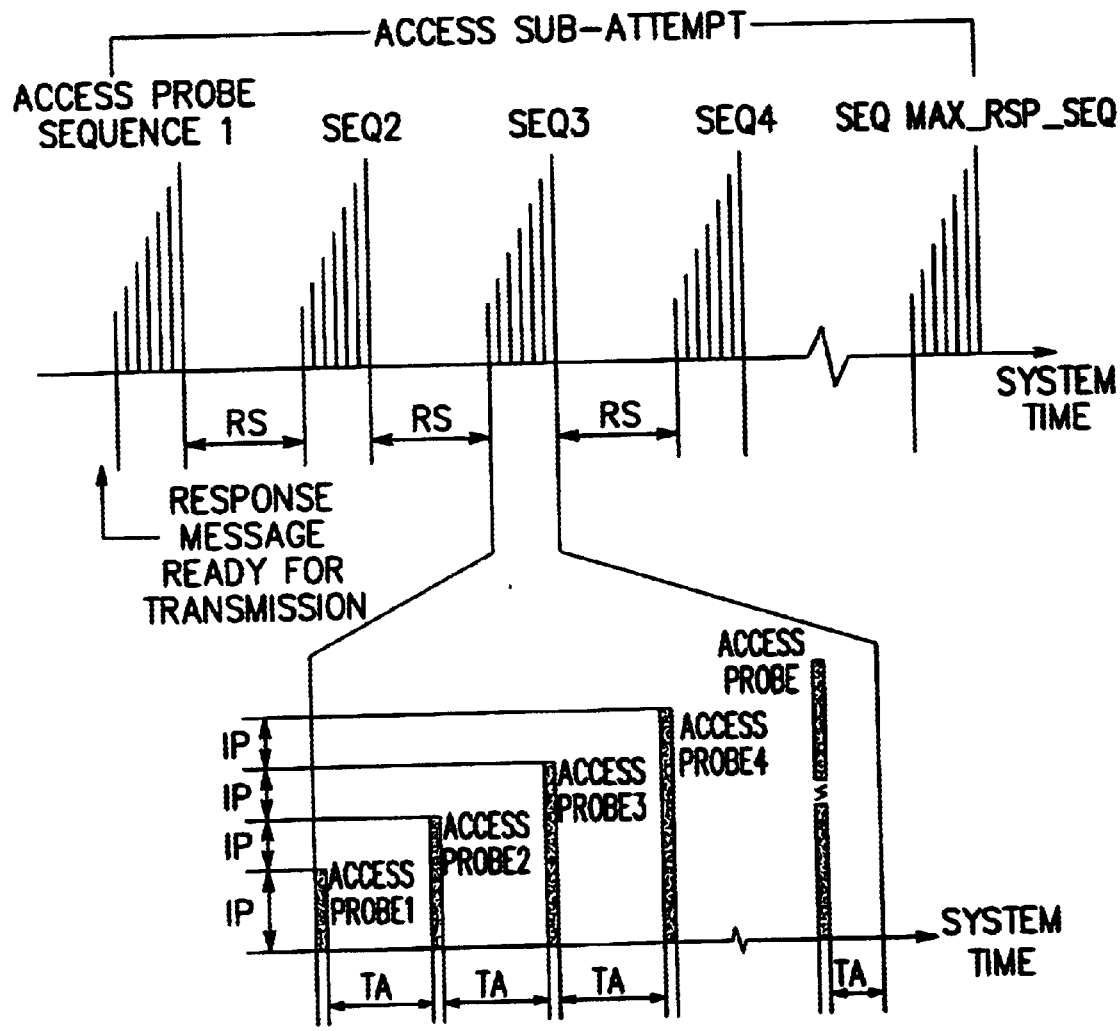
FIG. 9 illustrates a message transmission procedure on a common channel designated as dedicated to specific mobile stations.

The transmission controller 551 applies a different message transmission procedure depending on the dedicated/common value received from the control message analyser 515. That is, when the dedicated/common value indicates a common channel, a plurality of mobile stations are to send messages on a common access channel. Thus, they send messages on the common access channel in the method shown in FIG. 8. On the other hand, if the dedicated/common value indicates a dedicated channel, a specific mobile station sends a message on a dedicated access channel by performing an access attempt as shown in FIG. 9. The message buffer 553 sends an access channel message under the control of the transmission controller 551, and the transmitter 533 outputs the access channel message at a power level corresponding to an access probe number under the control of the transmission controller 551. The access channel message transmission under the control of the transmission controller 551 will be described later with reference to FIGS. 8, 9, and 11.

The memory 519 stores parameters necessary for transmitting on an access channel according to the embodiment of the present invention. The parameters are listed below.

TABLE 1

| long code ID | dedicated/common | maximum duration |
|---|---|---|
| long code 1 | dedicated | T1 |
| long code 10 | common | T2 |
| long code 25 | common | T3 |
| . | . | . |
| . | . | . |
| . | . | . |

As illustrated in Table 1, the memory 519 stores information on available long code IDs, dedicated/common, and maximum duration. The long code controller 517 determines which long code to be generated in the long code generator 521 on the basis of the dedicated/common, long code ID, and maximum duration values received from the control message analyser 515 and the information stored in the memory 519. The memory 519 functions to store information on available long codes. The available long codes include access channel long code masks assigned by access channel parameter messages in a general communication system and additional long code IDs assigned by control messages in the communication system of the present invention.

If the dedicated/common value indicates a dedicated channel and there is no long code ID, a long code is generated by a public long code mask determined by the unique number (i.e., ESN: Electronic Serial Number) of a mobile station. Here, the base station is assumed to know the unique long code of the mobile station from a previously received message. The unique long code is also used for a traffic channel, but no contention is likely to happen because the access channel and the traffic channel are not used concurrently. If the dedicated/common value indicates a dedicated channel and a long code ID is given, a spreading code is generated from the assigned long code ID for spreading the reverse common channel message. Here, if the long code ID represents one of several separately procured long code masks, the base station does not assign the long code ID to another mobile station, so that no message contention may happen.

If the dedicated/common value indicates a common channel and the long code ID is given, the assigned long code is used. In the absence of the long code ID, one of the available long codes stored in the memory 519 is selected by a random number generation function provided to the long code controller 517. When there is a failure in an access attempt using a long code received from the control message analyzer 515, the long code generator 517 can perform an access attempt again by use of a long code selected by the random number generation function among the available long codes in the memory 519. Therefore, in the absence of long code information in the control message, a long code is selected from among the available long codes in the memory 519 by the random number generation function.

The long code is fed from the long code generator 521 to the PN spreader 531. In case a maximum duration value is given for the long code ID, the corresponding long code is no longer used when a timeout represented by the maximum duration value has elapsed. This can be performed by setting a timer in the long code controller 517. The bit rate controller 523 controls the channel encoder and orthogonal modulator 525 on the basis of the received bit rate value, so that data can be transmitted at the designated bit rate.

Therefore, for transmitting a response message for the forward control message or an access message on the access channel, the information on long code, bit rate, and maximum duration in the forward control message are reflected as reverse channel parameters.

Figure 6:
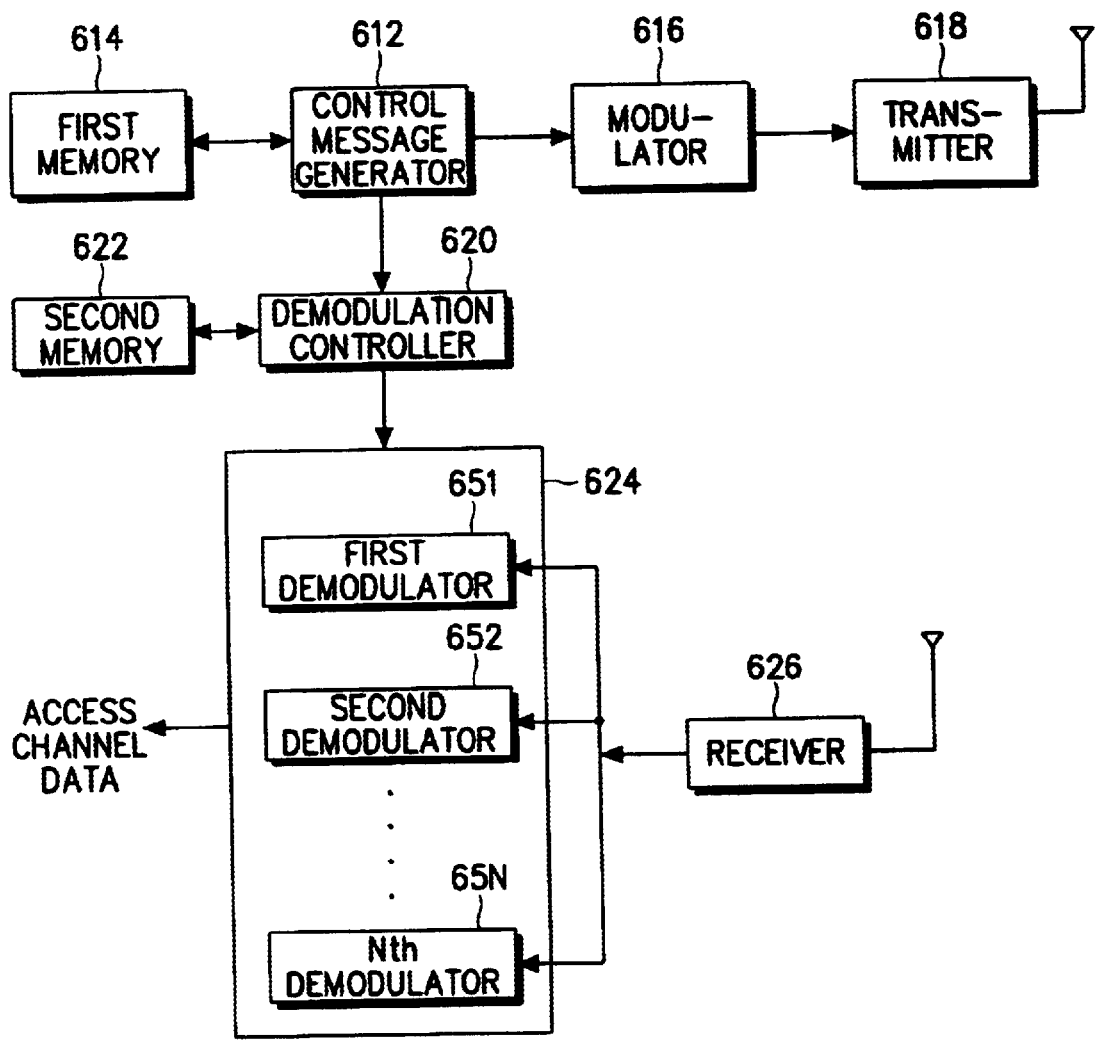
FIG. 6 is a block diagram of a base station for sending a common channel message in the communication system according to an embodiment of the present invention.

FIG. 6 is a block diagram of a base station for data communication according to an embodiment of the present invention.

Referring to FIG. 6, a control message generator 612 generates control message data including access channel-related information. A modulator 616 modulates the transmit signal and a transmitter 618 sends the modulated signal on a forward common channel (e.g., paging channel or forward common control channel) as an RF signal. The control message generator 612 feeds the access channel-related information (i.e., long code ID, dedicated/common, maximum duration, and bit rate) to a demodulation controller 620. The demodulation controller 620 controls a demodulation unit 624 to demodulate a signal received from a receiver 626 on the basis of the information. A first memory 614 stores information on services being provided and a long code ID assigned to each mobile station, as shown in Table 2, for offering reference to the control message generator 612. The first memory 614 also retains information on long code type (dedicated or common), number of mobile stations to which a long code is available if the long code is common, and the like. A second memory 622 stores long code assignments and expiration times in respective demodulators 651 to 65N so that the demodulation controller 620 can refer to the information.

TABLE 2

| mobile station ID | service type | long code ID |
|---|---|---|
| mobile 1 | real time video | long code 1, 10, 25, . . . |
| mobile 2 | file transfer | long code 10, 30, . . . |
| mobile 3 | fax | long code 11, . . . |
| . | . | . |
| . | . | . |
| . | . | . |

TABLE 3

| demodulator number | long code ID | dedicated/ common | maximum duration | bit rate |
|---|---|---|---|---|
| demodulator 1 | long code 1 | dedicated | 10 seconds | 9600 bps (fixed) |
| demodulator 2 | long code 30 | common | (no duration) | 4800 bps (fixed) |
| demodulator 3 | long code 11 | common | (no duration) | rate set 1 (variable) |
| . | . | . | . | . |
| . | . | . | . | . |
| . | . | . | . | . |

The first memory 614 stores information on service types in which mobile stations are engaged and current long code IDs assigned to them, as illustrated in (table 2). The service type represents QOS (Quality Of Service). The second memory 622 stores information on long code IDs, dedicated/common, maximum durations, and bit rates used by the demodulators 651 to 65N, as illustrated in (table 3). The control message generator 612 determines a long code to be assigned based on the information in the first memory 614 and loads corresponding information on long code ID, dedicated/common, maximum duration, and bit rate on a control message for transmission.

As a way to designate a spreading code for spreading a reverse common channel message dedicated to a particular mobile station as described in FIG. 4, the base station sets the dedicated/common field of a control message to dedicated and leaves the long code ID field vacant so that the mobile station can use a public long code determined by its own ESN. Upon receipt of the control message, the mobile station generates the public long code mask using its ESN and spreads the reverse common channel message by a long code generated with use of the public long code mask. This long code is used as dedicated to the mobile station without incurring message contention.

Another method of assigning a dedicated long code to a mobile station is that the base station selects a long code ID among the pool of long code IDs which has not been previously assigned to a different mobile station among long code IDs and sends the selected long code ID to the mobile station via control message. For allowing the corresponding mobile station to transmit the reverse common channel message without contention with signals from other mobile stations, the selected long code ID will not be reassigned to another mobile station while it is used. While the mobile station is using the long code ID, the base station does not assign the same long code ID to a different mobile station, effectively dedicating the long code ID to the mobile station.

In order to assign a long code as common to the mobile station, the base station sets the dedicated/common field of the control message shown in FIG. 4 to common and loads the long code ID field with a long code selected from the separately procured long code IDs but not designated as dedicated to a specific mobile station. When the base station is to assign a common long code to another mobile station, the occupied long code can be reassigned to the mobile station. The probabilities of contention caused by assignment of the same long code differ according to mobile station classes and quality of service by controlling the number of mobile stations using the same long code.

Assignment of a common long code can be achieved by sending forward common channel message which includes an existing access channel identifier. That is, if no additional access channel number is not notified, the dedicated/common field is set to common, and the long code ID field is vacant, the mobile station determines an access channel long code to use in a conventional way. This method can designate a common long code used as semi-dedicated using the method described above. Also, a common long code can be used in a dedicated mode by assigning the long code to a mobile station for a predetermined time, while preventing other mobile stations from using the same long code.

The demodulation controller 620 receives the access channel-related information from the control message generator 612, assigns long codes to the demodulators 651 to 65N when necessary, and stops the operation of a demodulator using a long code which becomes due. A long code demodulation time period is checked by setting a timer in the demodulator controller 620. The demodulation controller 620 controls the operations of the demodulators 651 to 65N according to receivable bit rates so that signals received from the receiver 626 can be reliably demodulated.

Figure 7A:
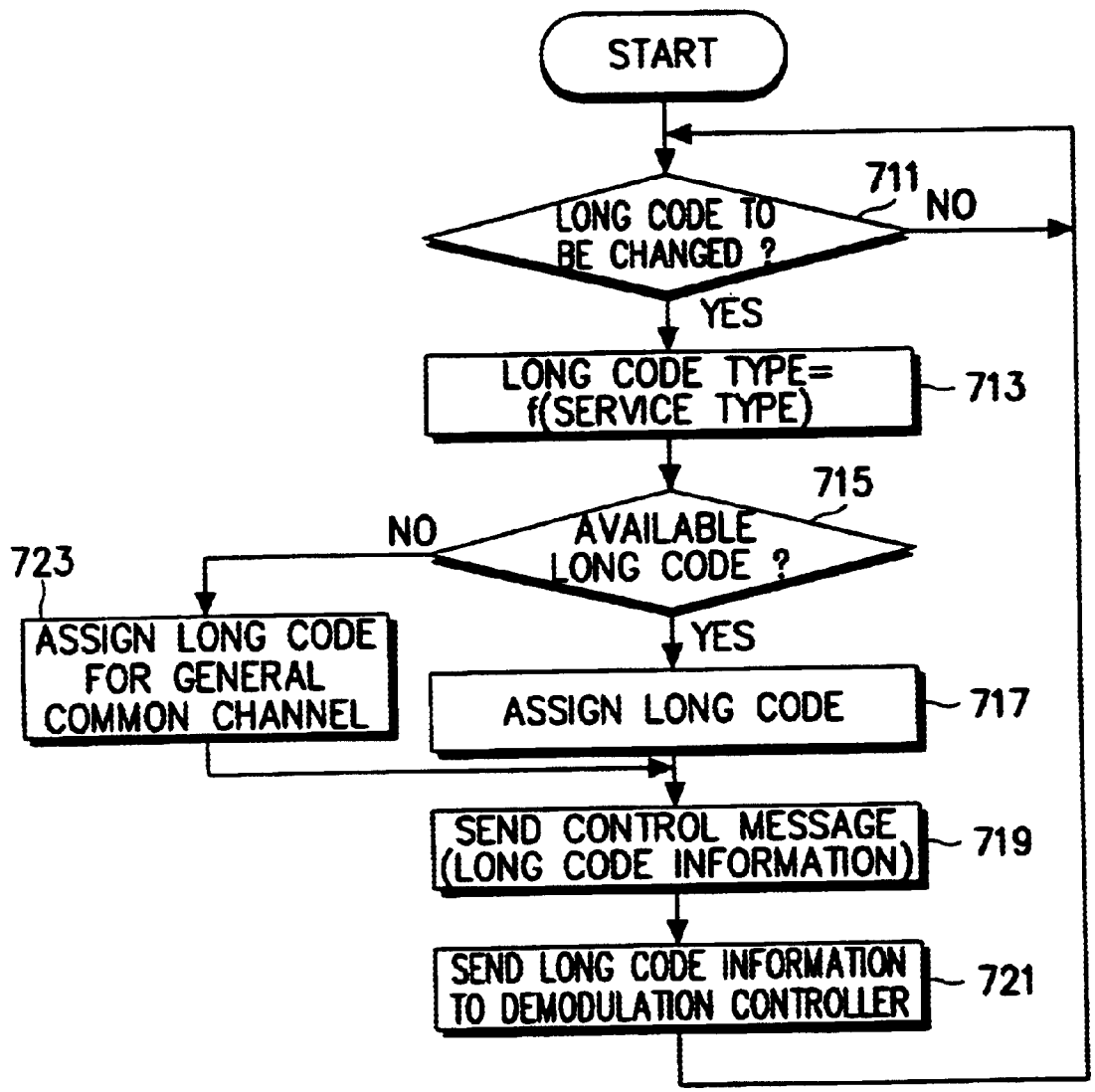
FIGS. 7A and 7B are flowcharts respectively illustrating a control message generation and a demodulator control in the base station of the communication system according to the embodiment of the present invention.
Figure 7B:
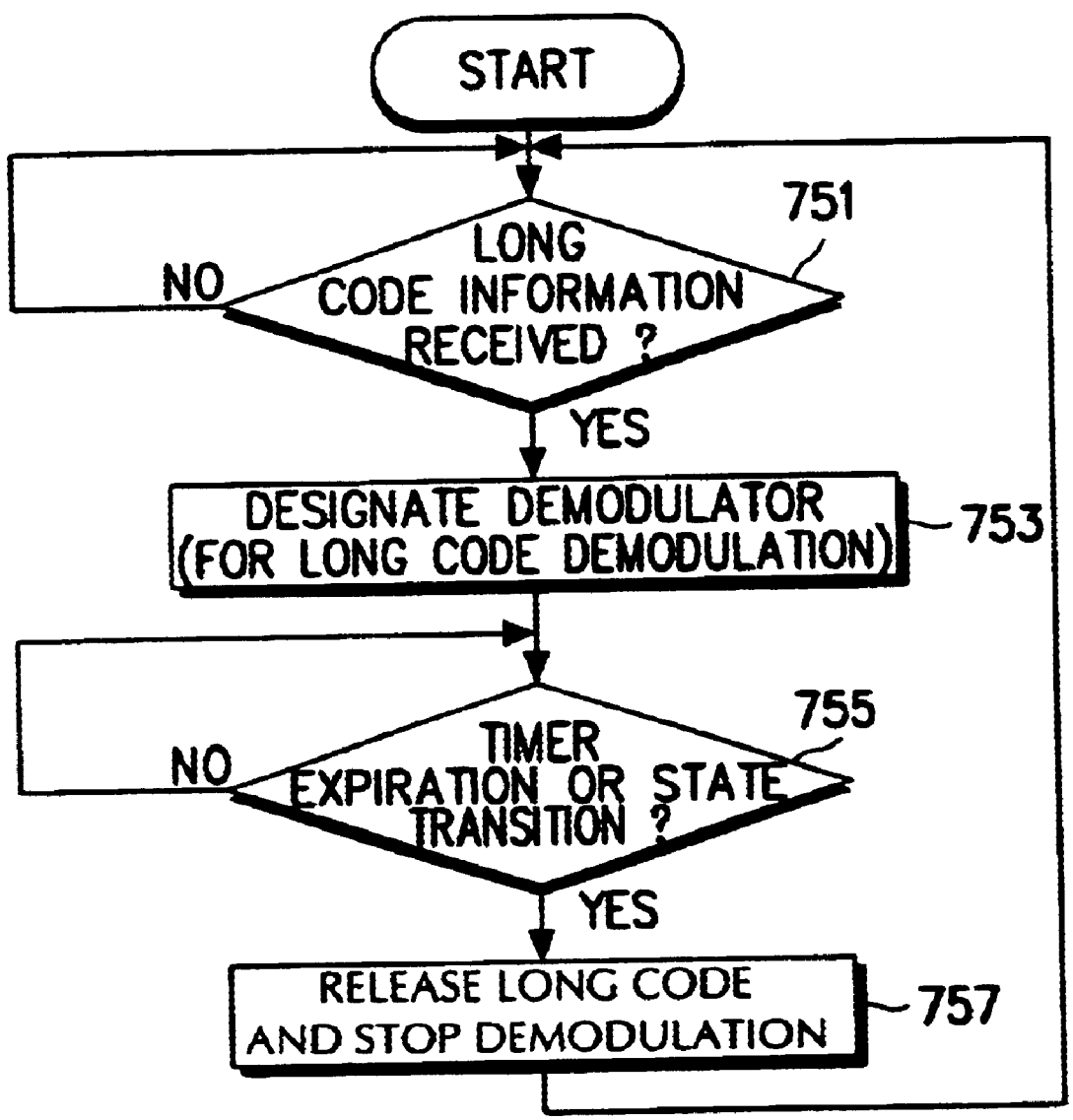

FIGS. 7A and 7B are flowcharts respectively illustrating the operations of the control message generator 612 and the demodulation controller 620 in the base station of FIG. 6.

Referring to FIG. 7A, the control message generator 612 determines whether the long code assigned to an access channel requires change for a mobile station communication in step 711. The long code is changed in the following situations: when a common channel state is entered, a long code assignment is changed, a response message long code is changed, or the maximum duration of the response message long code is extended. If there is a cause for changing the long code, the control message generator 612 determines the type of a long code to be newly assigned, in step 713. Long code types are classified as dedicated, high-class common, and normal-class common. In step 715, the control message generator 612 determines whether there is an available long code. Upon the presence of the available long code, the long code is determined to be assigned, in step 717. In the absence of an available long code, a long code is assigned to designate a general common access channel in step 723. After a corresponding long code is determined, parameters including the long code information is sent to the modulator 616, in step 719. In step 721, the control message generator 612 also sends the long code information to the demodulation controller 620 and ends the routine.

Referring to FIG. 7B, illustrating demodulator control in the base station, the demodulation controller 620 determines whether the long code information is received from the control message generator 612, in step 751. Upon receipt of the long code information, the demodulation controller 620 designates a demodulator for demodulating the long code, in step 753. Then, the demodulation controller 620 checks a timer or state transition, in step 755. If the timer is expired or a state transition occurs, the assigned long code is discarded and the demodulator operation is stopped, in step 757.

For transmission of a message from a mobile station on an access channel, a different procedure is performed depending upon the dedicated/common field of a received control message. FIG. 8 illustrates how an access channel message is sent for an access channel designated as common. If the access channel is designated as dedicated, the procedure follows the method illustrated in FIG. 9.

Figure 10A:
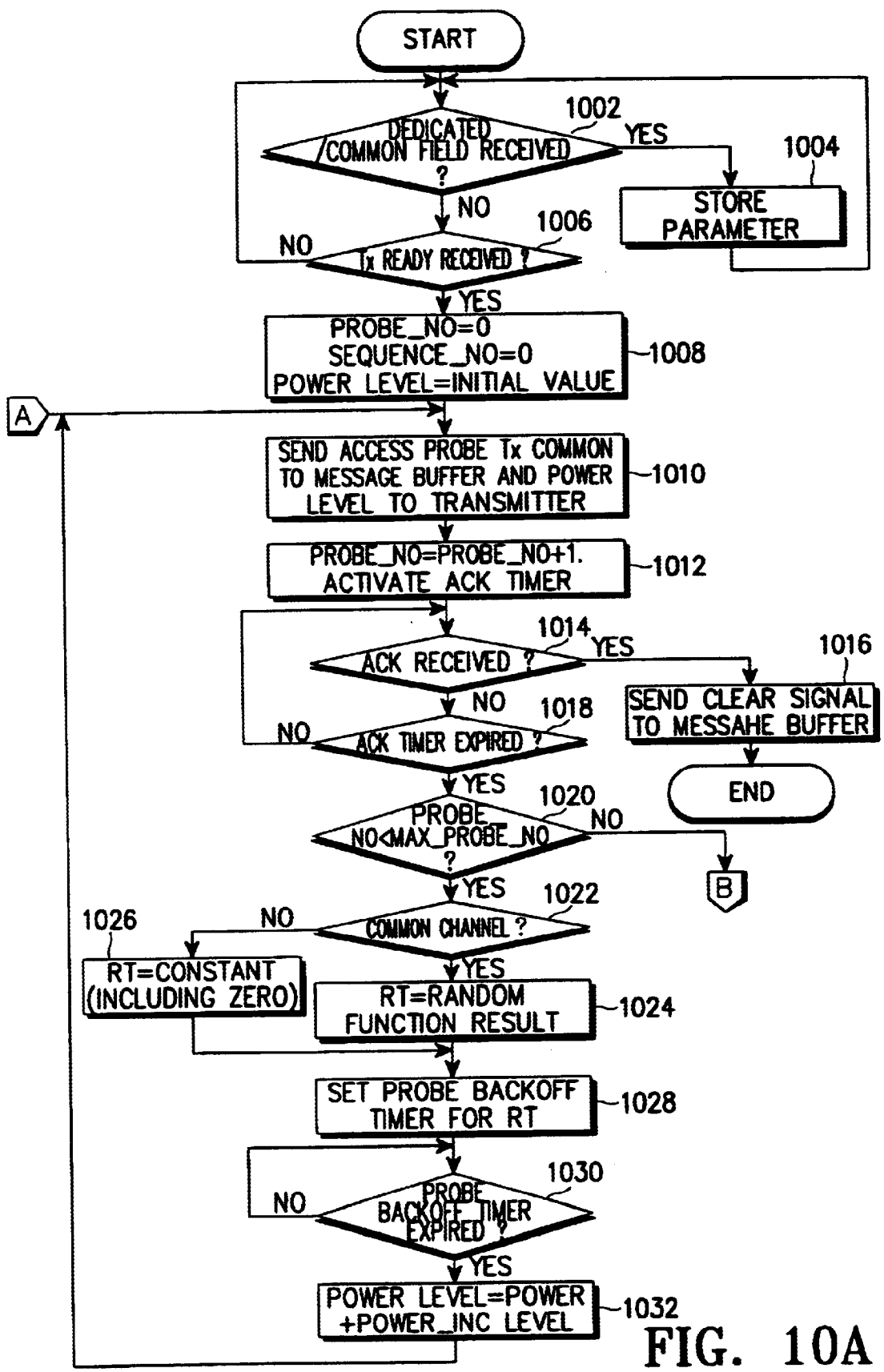
FIGS. 10A and 10B are flowcharts of transmitting a common channel message from the mobile station in the communication system of the present invention.
Figure 10B:
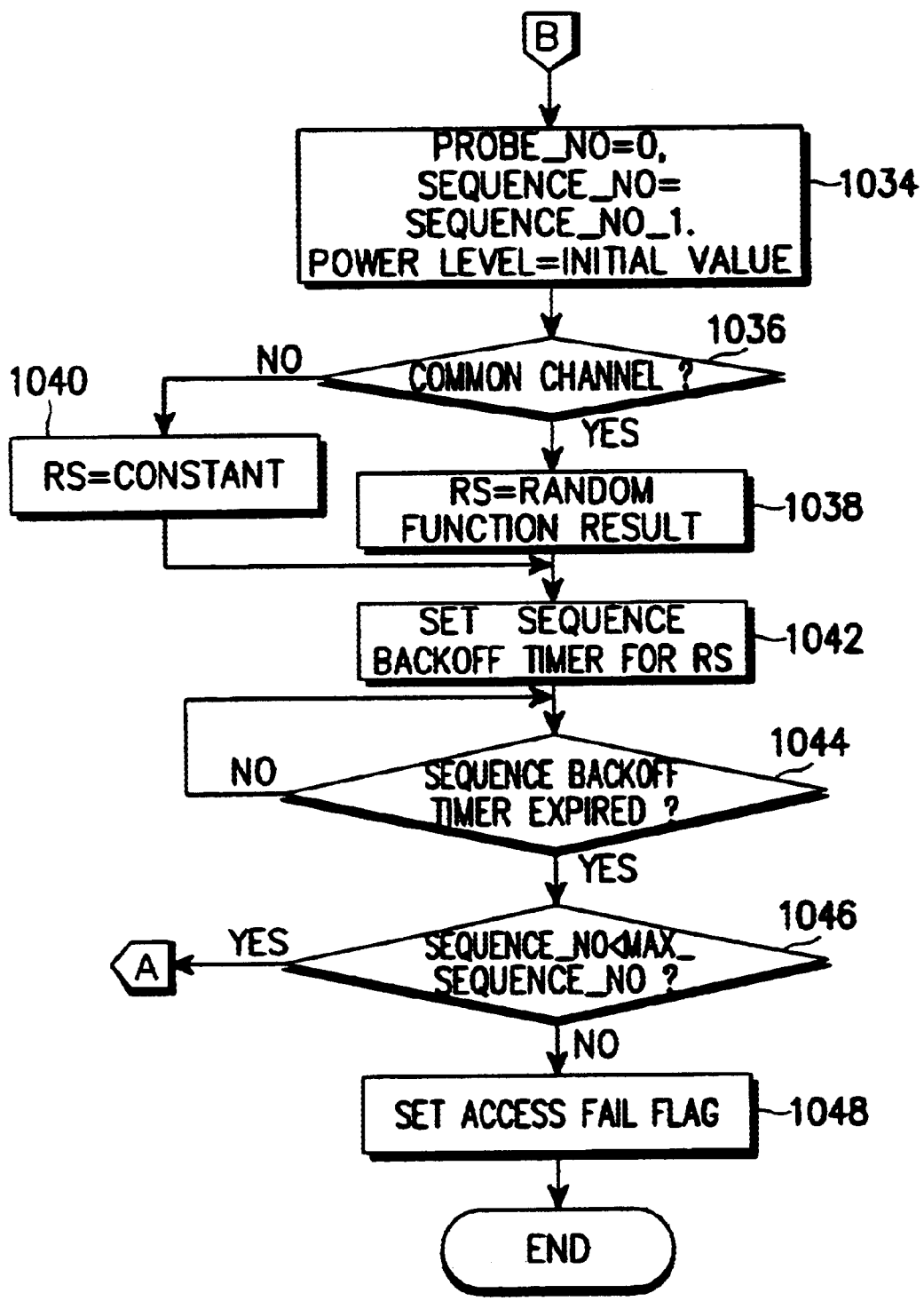

FIGS. 10A and 10B are flowcharts illustrating access channel message transmissions depending on the dedicated/common field.

Referring now to FIGS. 8–10B, a description of the access channel message transmission procedures will be provided according to an embodiment of the present invention.

FIGS. 8 and 9 generally describe message transmissions on an access channel from a mobile station. The process of sending one message and receiving, or failing to receive, an acknowledgement for that message is called an access attempt. Each transmission in the access attempt is called an access probe. Each access probe consists of a preamble and a message capsule. Within an access attempt, access probes are grouped in access probe sequences. Each access probe sequence is comprised of a predetermined number of access probes, and the entire access attempt is comprised of a predetermined number of access probe sequences. The first access probe of each access probe sequence is transmitted at an initial power level and each subsequent access probe is transmitted at a progressively higher power level than the previous access probe.

The time interval RS between access probe sequences is set differently depending on the type of access channel, that is whether an access channel is designated as dedicated or common. In the case of a common access channel, the time interval is determined by a random function (i.e., RT) as shown in FIG. 8. In the case of a dedicated access channel, it is determined to be a constant (i.e., TA) as shown in FIG. 9. The time interval (TA+RT) between access probes of an access probe sequence varies with access channel types. For a common access channel, it is determined by a random function as shown in FIG. 8, while for a dedicated access channel, it is determined as a constant which may be zero. Referring to FIG. 8, after transmitting each access probe, the mobile station waits a specified period, TA to receive the acknowledgement. If an acknowledgement is received, the access attempt ends successfully. If no acknowledgement is received, the next access probe is transmitted after an additional backoff delay, RT. Backoff is defined herein as the interval between access probes. In order to avoid endless contention, the value should be a random value. In FIG. 8, RT and RS are given as first and second wait time periods, respectively. Also, it is assumed that respective constants designating the first and second wait time periods are first and second constants.

FIG. 10 is a flowchart illustrating the method steps for performing a message transmission in accordance with FIGS. 8 and 9. Referring to FIG. 10, the transmission controller 551 determines in step 1002 whether a dedicated/common field value is received from the control message analyzer 515, and if such a value is received, storing the received parameter in step 1004. In step 1006, the transmission controller 551 determines whether a transmission ready signal, Tx Ready is generated from the message buffer 553. Upon generation of a message to send on an access channel from a higher layer processor, the message buffer 553 stores the access channel message and notifies the transmission controller 551 that it is ready for transmission.

Upon receipt of the transmission ready signal Tx Ready, the transmission controller 551 initializes a probe number Probe_No and a sequence number Sequence_No to zero, and an initial power level to transmit the access channel message, in step 1008. Then, the transmission controller 551 outputs an access probe transmission command to the message buffer 553 and the current power level to the transmitter 533, in step 1010. In step 1012, the transmission controller 551 increments the probe number by 1, sets an ACK timer for checking an acknowledgement period, and awaits the acknowledgement from the base station. The ACK timer is set for TA, a period for the mobile station to await the acknowledgement after transmission of the access channel message.

Then, the message buffer 553 outputs a currently stored access channel message, the channel encoder and orthogonal modulator 525 subjects the access channel message to channel encoding and orthogonal spreading, and the PN spreader 531 spreads the spreaded access channel message by a long code generated from the long code generator 521 and a PN spreading sequence. The transmitter 533 sends the access channel message in the form of an RF signal at the power level designated by the transmission controller 551.

Upon receipt of the access channel message in an access channel receiver of the base station, a paging channel transmitter thereof sends an acknowledgement message. In step 1014, the transmission controller 551 determines whether the acknowledgement is received from the control message generator 515. Upon receipt of the acknowledgement, the transmission controller 551 outputs a clear signal to the message buffer 553 in step 1016. Then, the message buffer 553 clears the internally stored message in response to the clear signal, and is ready for the next state.

If no acknowledgement is received until the timer expires in steps 1014 and at step 1018, the transmission controller 551 considers that the base station failed to receive the access channel message, and attempts to re-transmit the access channel message. In step 1020, the transmission controller 551 determines whether the current probe number is larger than a maximum probe number in an access probe sequence. If the current probe sequence number is within the current access probe sequence, at step 1022, the transmission controller 551 determines whether an access channel on which the current access channel message is to be sent is designated as dedicated or common, based on the parameter stored at step 1004, to set the random time RT after which the access channel message is re-transmitted.

For a common access channel, the random time RT is determined by a random function, while for a dedicated access channel, the random time RT is set as a predetermined constant which may be zero. On the common access channel the access channel message is repeatedly transmitted at each RT time interval. The TA is defined in order to avoid continuous message contention since a number of mobile stations are likely to attempt to acquire the common access channel. By contrast, since a specific mobile station or a few mobile stations attempt to use the dedicated access channel, there is no need for delaying a transmission by the random time after the acknowledgement period, and thus the random time, RT is set as a predetermined constant. The random time RT may be determined randomly by a random function, which may be a Hash function. The random time RT is determined in steps 1024 and 1026 for the common channel and designated channel cases, respectively, and a probe backoff timer is set for RT in step 1028.

The transmission controller 551 waits for the time TA+RT, and then increments the power level in step 1032. Then, it returns to step 1010 where the access channel message is transmitted again. If no acknowledgement is received within the corresponding access probe sequence in step 1020 while the access channel message is transmitted repeating the above procedure, the transmission controller 551 sets the probe number to zero, increments the access probe sequence number by 1, and sets the transmission power level to the initial value, in step 1034, (See FIG. 10B).

In step 1036 of FIG. 10B, the transmission controller 551 determines whether the access channel on which the current access channel message is to be transmitted is designated as dedicated or common in order to determine the time interval RS between access probe sequences. The determination is made by the parameter obtained in step 1004. For a common access channel, the transmission controller 551 sets RS to a time period resulting from a random function in step 1038. For a dedicated access channel, RS is a predetermined constant in step 1040. In summary, RT and RS are obtained by random functions in the case of a common access channel, while RT and RS are predetermined constants (RT can be zero) in the case of a dedicated access channel.

Then, the transmission controller 551 sets a sequence backoff timer for RS and awaits for the elapse of time RS, in steps 1042 and 1044. When the time RS has elapsed, the transmission controller 551 determines whether the current sequence number is smaller than a maximum sequence number, in step 1046. If it is smaller, the access channel message is transmitted in the next sequence in step 1010. If the current sequence number is not smaller than the maximum sequence number, an access fail flag is set to declare the failure of access channel message transmission, in step 1048 and the routine ends.

As described above, RS and RT are randomly determined or predetermined constants depending upon whether an access channel is designated as dedicated or common. Accordingly, the efficient use of the access channel is enhanced and its transmission delay is reduced.

Now, the access channel use the scheme described above, that is, long code assignment will be described in detail.

A plurality of long codes can be assigned for use with access channels. Concurrent message transmission from mobile stations using different long codes experience no contention for access channels. Yet, mobile stations sharing an identical long code may lose their messages due to message contention when they are simultaneously transmitted. Hence, there is a need for an efficient method of assigning access channel long codes to mobile stations.

There are three cases where the base station addition assigns a common channel long code to a mobile station: (1) transition from a dedicated channel state to a common channel state in packet service; (2) changing a previously assigned access channel long code and allowing continuous use of a newly assigned long code in a common channel state; and (3) changing a previously assigned access channel long code and allowing use of a newly assigned long code for a limited time period.

Upon entering the common channel state, a long code assignment is also applied to a mobile station which initiates communication with the base station. Shortly before a dedicated channel state transitions to the common channel state an access channel parameter is sent through a forward control message. That is, the base station assigns a long code to the mobile station at the point in time of a state transition from the dedicated channel state to the common channel (access channel) state. Though the base station can assign the long code by the control message of FIG. 4, it is not always necessary. Whether this additional long code assignment should be performed is determined according to the service type and quality being provided to the mobile station. The mobile station stores the long code information in the memory 519 to be used for an access attempt. If a communication fails on the access channel of the assigned long code, the access channel corresponding to a conventionally assigned long code previously used in an initial stage for a call set-up can be re-used.

In one embodiment of the present invention, the base station can change an access channel long code previously assigned to the mobile station through a forward control message in the common channel state of packet service. In this case, since a newly assigned long code lasts as long as the packet service is in the common channel state, no maximum duration is designated.

A long code can be assigned with a limited duration to transmit a response message for a base station message received on a paging channel. When the base station requests a response message from the mobile station in the common channel state, it assigns a long code indicating an access channel on which to send the response message through a forward control message. Then, the mobile station sends the response message on a dedicated or common access channel designated by the control message. In this case, a maximum duration is set so that the assigned long code is used for a time period required for transmitting the response message. If the response message exceeds one access channel slot in length, long codes for successive access channel slots can be assigned by indicating a continuation requirement in an acknowledgement of the previous slot.

Figure 11:
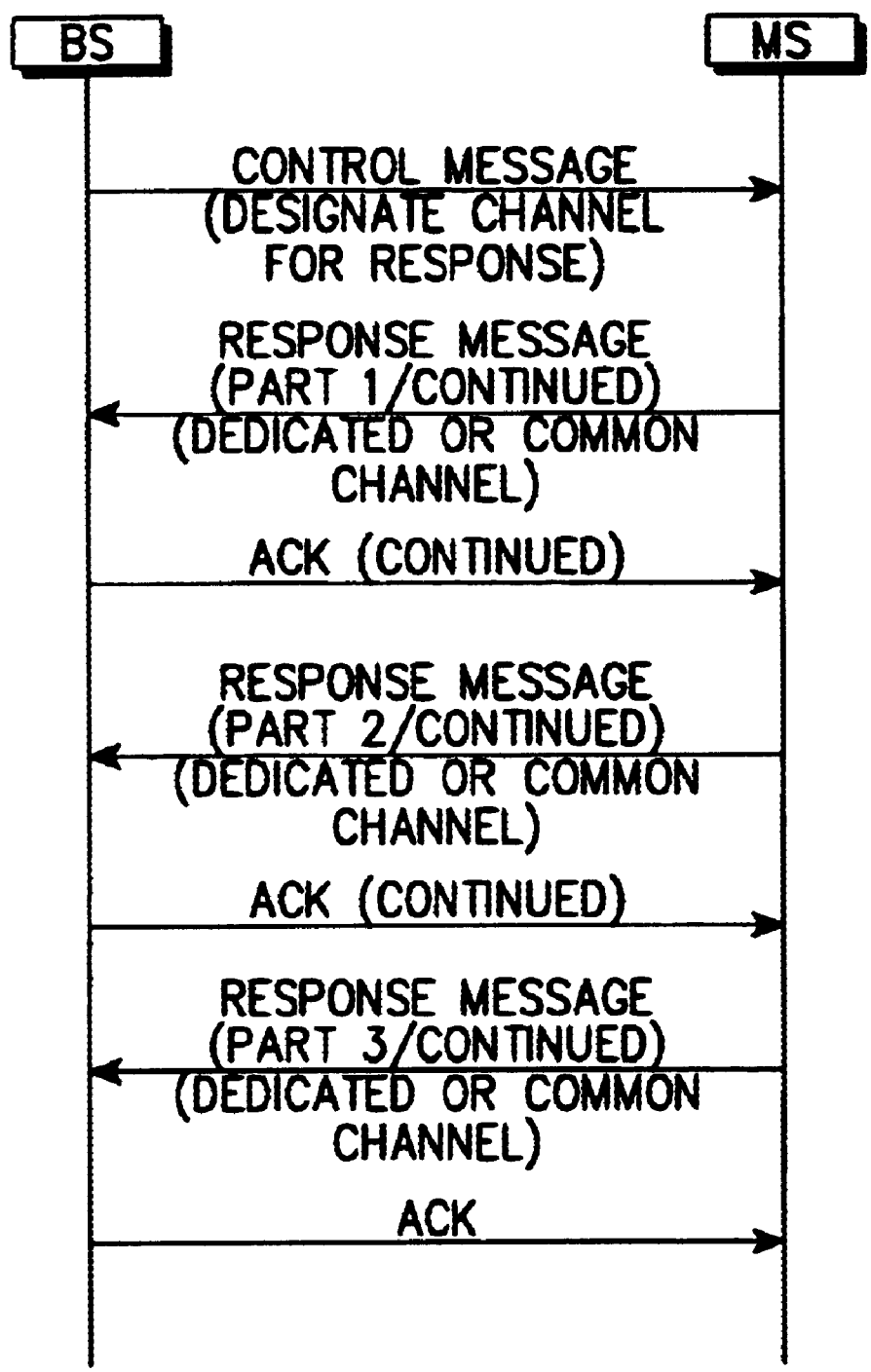
FIG. 11 is a flowchart of an embodiment of continuous common channel message transmission between the base station and the mobile station in the communication system of the present invention.

FIG. 11 is a view showing a response message transmission in three slots with continuation indications in the acknowledgement message. That is, the long code assignment for successive access channel slots is achieved by replacing long code information with a continuation indication in a forward acknowledgement message sent to assign the previous access channel slot.

There are two types of long code assignment. One is designation of a long code as dedicated. To do this, the dedicated/common field is set to dedicated. The mobile station uses as a dedicated access channel long code its unique long code (resulting from a public long code mask determined by a permuted ESN) or a long code assigned by a long code ID field, if the long code ID field has the specific long code. In the latter case, the specific long code ID is not reassigned to another mobile station while the mobile station occupies the long code ID. This scheme provides a contention-free access channel and reduces transmission delay, without increasing the complexity of the base station and the mobile station. Furthermore, better use is made of a demodulator pool of the demodulation unit 624 in the base station. Use of the unique long code of the mobile station to spread an access channel message is valid only if the packet service is in a state preserving the corresponding unique long code or the base station is notified of the unique long code information on an access channel. The time interval between access probes for sending an access channel message to the base station can be set as a constant as shown in FIG. 9, when using the dedicated code channel.

The other type of long code assignment is assignment of an access channel depending on channel class. This long code assignment scheme limits and varies the number of mobile stations for each long code, so that channel classes vary with service type. That is, as a contention probability is proportional to the number of mobile stations using a channel, channel classes are determined based on the contention probability. In an extreme case, a channel assigned to a single mobile station functions as a dedicated channel, and a channel shared by all mobile stations becomes a common channel in the sense of the term as used in a conventional system. For example, a higher-class channel is assigned to a service requiring real time or immediate processing (e.g., video signal) and a lower-class channel is assigned to a service allowing a small time delay or having a lower processing priority (e.g., e-mail).

The access efficiency of the access channel is increased by setting a bit rate. This is called a multi-bit rate access channel assignment. The bit rate of an access channel is controlled by setting an intended bit rate at which to transmit data on the access channel in a field of a forward control message, thereby offering the advantages of an expedited response message transmission, reduction of a variation in response time, and the increase in use efficiency of a mobile station demodulator. Here, the bit rate can be set regardless of long code assignment types.

Now turning to a continuous message transmission on a common channel, an access channel message may exceed a one-time transmissible length in some cases, and as a result is likely to collide with another access channel message. In other words, when the mobile station is to transmit an access channel message in a plurality of slots, a message transmission is delayed due to message contention with other mobile stations, resulting in loss of the access channel message at worst. Thus, in transmission of an access channel message in a plurality of slots, a continuation flag is inserted in a current access channel message to indicate that there remain other successive messages to send. Such an access channel message has the following format:

TABLE 4

| message type | continuation flag | des_req flag | data |
--- where message type denotes a response or access channel message, continuation flag indicates presence or absence of the next message to be sent, channel designation request flag (des_req_flag) indicates presence or absence of a channel designation request, and data is response data or data to send from the mobile station to the base station, as actual data of the access channel message.

A description of a continuous message transmission on an access channel from a mobile station to a base station will be described. The control message generator 612 of the base station generates a control message upon receipt of an access channel message from the demodulation unit 624 or a mobile station paging message from a higher layer message processor and sends the control message to the mobile station. Then, the control message analyzer 515 of the mobile station analyzes the control message and sends the base station a response message on an access channel.

If the response message is too long to be sent at one time, the continuation flag of the response message frame is set as shown in Table 4. Then, the control message generator 612 and the modulation controller 620 in the base station controls transmission of an access channel message from the mobile station in the procedures illustrated in FIGS. 7A and 7B.

Figure 12:
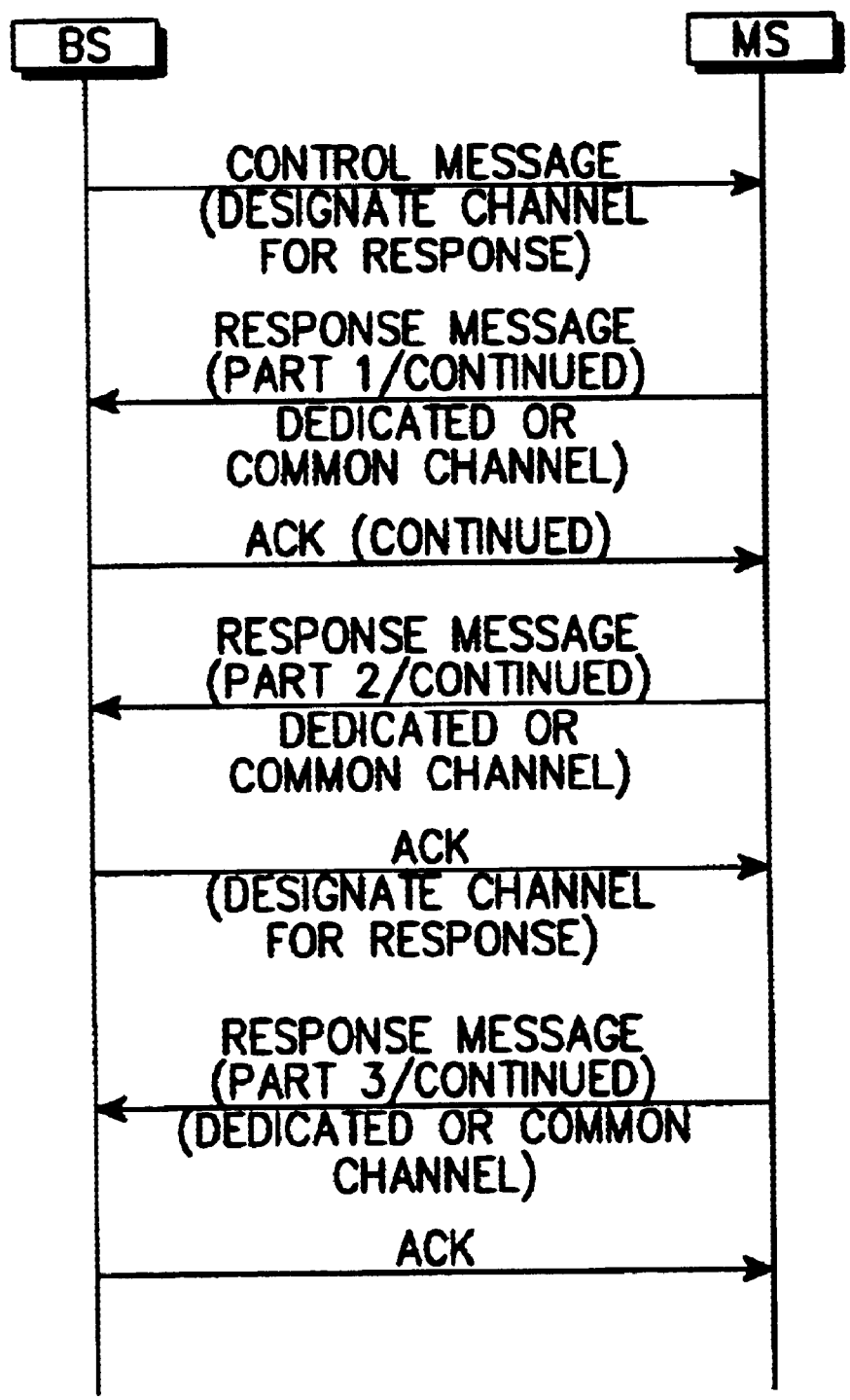
FIG. 12 is a flowchart of another embodiment of continuous common channel message transmission between the base station and the mobile station in the communication system of the present invention.

FIGS. 11 and 12 illustrate continuous transmissions of plural message frames on an access channel from a mobile station to a base station. In FIG. 11, the mobile station sends a response message on the access channel in a plurality of slots using the same long code ID. The access channel may be designated as common or dedicated. On an initial access channel assigned by the base station, the mobile station continuously sends a plurality of access channel message frames on the same assigned access channel. Alternatively, the long response message can be sent with different long code IDs. As shown in FIG. 12, when a handoff occurs from a base station to another base station, the base station can designate an access channel to the mobile station. In FIGS. 11 and 12, part 1, part 2, and part 3 indicate successive messages on the assumption that the access channel message sent from the mobile station occupies three frames. The base station extends a channel duration time by assigning a long code ID and changing a maximum duration for transmission of a multi-frame access channel message from the mobile station.

As described above, the base station determines whether the next message to be received is present by analyzing the continuation flag of a message received from the mobile station. If there remains another message to be received, it is determined whether a current long code should be changed. If an available long code is considered to be present after analysis of the current long code, the corresponding long code ID is loaded in an acknowledgement message. Each time a message is received from the mobile station, the above procedure is performed. Therefore, channels assigned for receiving the messages can be the same or different. That is, the base station designates the same or different channels as necessary.

Figure 13:
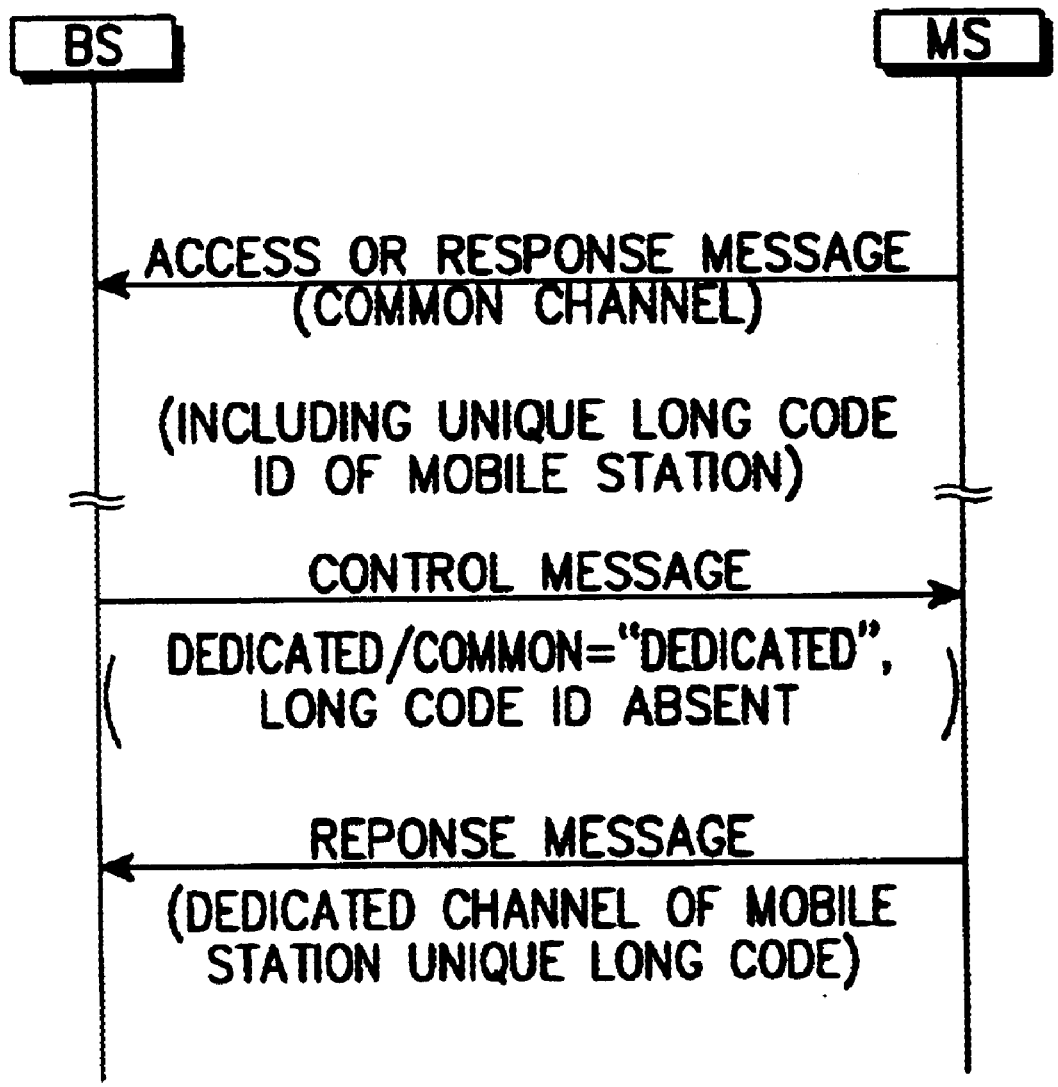
FIG. 13 is a flowchart of a message transmission on an access channel designated as dedicated to a specific mobile station by its assigned unique long code in the communication system of the present invention.

If the mobile station is independently assigned a long code ID which designates an access channel as dedicated, the mobile station alone can use the access channel as dedicated without the need of assigning a long code by the base station. FIG. 13 illustrates a message communication between a base station and a mobile station. Referring to FIG. 13, the mobile station sends an access channel message including its unique long code information to the base station, and then the base station sets the dedicated/common field to dedicated and no long code ID in a control message as shown in FIG. 4. The mobile station sends a response message on an access channel designated as dedicated by the unique long code. Here, the unique long code is determined by the ESN of the mobile station.

The access channel data communication device of the present invention as described above offers the benefits of controllable contention probability, rapid response, and access channel at a multi-bit rate. In case a message is too long to be sent on an access channel at one time, requiring plural slots, specific access channels are designated for continuous message transmission to thereby a message transmission delay. Without the need for assigning a long code ID to the mobile station by the base station, the mobile station can send an access channel message on an access channel designated as dedicated by its unique long code.

While the present invention has been described in detail with reference to the specific embodiments, they are mere exemplary applications. Thus, it is to be clearly understood that many variations can be made by anyone skilled in the art within the scope and spirit of the present invention.

What is claimed is:

1. A common channel message communicating device in a base station of a CDMA communication system, comprising:

a control message generator for generating a control message including information representative of a spreading code for spreading a reverse common channel message; and a forward common channel transmitter for transmitting the control message on a forward common channel, wherein the reverse common channel message is sent to the base station in predetermined time intervals.

2. The device of claim 1, wherein the spreading code information is used for a mobile station exclusively to communicate with the base station when the mobile station spreads the reverse common channel message.

3. The device of claim 2, wherein the spreading code information is an access channel number.

4. The device of claim 3, wherein while the mobile station uses an access channel long code mask corresponding to the access channel number, the base station does not assign the same access channel number to a different mobile station, to prevent message contention between the mobile stations.

5. The device of claim 2, wherein the spreading code information represents use of a public long code generated with use of the ESN (Electronic Serial Number) of the mobile station.

6. The device of claim 2, wherein the spreading code information is a specific long code ID prepared to prevent message contention.

7. The device of claim 6, wherein while the mobile station uses an access channel long code mask corresponding to the specific long code ID, the base station does not assign the same long code ID to a different mobile station to prevent message contention between the mobile stations.

8. The device of one of claims 3 to 7, wherein the control message further includes information representative of a maximum duration of the spreading code.

9. The device of claim 8, wherein the reverse common channel message is an access channel message.

10. The device of claim 8, wherein the reverse common channel message is a reverse common control channel message.

11. The device of claim 1, further comprising a channel receiver for: receiving a message on a reverse common channel;

generating a spreading code based on the spreading code information upon receipt of a response message for the control message; and despreading the reverse common channel message by the generated spreading code.

12. A common channel message communicating device in a mobile station of a CDMA communication system, comprising:

a control message analyzer for analyzing information representative of an assigned spreading code included in a control message received on a forward common channel;

a spreading code generator for generating a spreading code based on the spreading code information; and a channel transmitter for spreading a reverse common channel message by the spreading code and transmitting the spread reverse common channel message, wherein the reverse common channel message is sent to the base station in predetermined time intervals.

13. The device of claim 12, wherein the spreading code information is used for the mobile station exclusively to communicate with a base station when the mobile station spreads the reverse common channel message.

14. The device of claim 13, wherein the spreading code information is an access channel number, and the spreading code generator generates the spreading code using an access channel long code mask corresponding to the access channel number.

15. The device of claim 13, wherein while the spreading code information indicates use of a public long code mask generated with the use of the ESN of the mobile station.

16. The device of claim 13, wherein the spreading code information is a specific long code ID prepared to prevent message contention, and the spreading code generator generates the spreading code using a long code corresponding to the long code ID.

17. The device of one of claims 14, 15, and 16, wherein the control message further includes information representative of a maximum duration of the spreading code.

18. The device of claim 17, wherein the reverse common channel message is an access channel message.

19. The device of claim 17, wherein the reverse common channel message is a reverse common control channel message.

20. The device of claim 12, further comprising a message generator for generating a message requesting assignment of a spreading code to spread a reverse common channel message when the mobile station is to send the reverse common channel message.

21. The device of claim 20, wherein the spreading code generator generates the spreading code using a public long code.

22. A common channel message communicating device in a CDMA communication system, comprising:

a base station having a control message generator for generating a control message including information representative of a spreading code for spreading a reverse common channel message, and a forward common channel transmitter for transmitting the control message on a forward common channel; and a mobile station having a control message analyzer for analyzing information representative of an assigned spreading code included in the control message received on the forward common channel, a spreading code generator for generating a spreading code based on the spreading code information, and a channel transmitter for spreading the reverse common channel message by the spreading code and transmitting the spread reverse common channel messages, wherein the reverse common channel message is sent to the base station in predetermined time intervals.

23. The device of claim 22, wherein the spreading code information is used for the mobile station exclusively to communicate with the base station when the mobile station spreads the reverse common channel message.

24. The device of claim 23, wherein the spreading code information is an access channel number.

25. The device of claim 24, wherein while the mobile station uses the access channel number, the base station does not assign the same access channel number to a different mobile station.

26. The device of claim 23, wherein the spreading code information represents use of a public long code generated with use of the ESN of the mobile station.

27. The device of claim 23, wherein the spreading code information is a specific long code ID prepared to prevent message contention.

28. The device of one of claims 24 to 27, wherein the control message further includes information representative of a maximum duration of the spreading code.

29. The device of claim 28, wherein the reverse common channel message is an access channel message.

30. The device of claim 28, wherein the reverse common channel message is a reverse common control channel message.

31. The device of claim 22, wherein the base station further has a channel receiver for:

receiving a message on a reverse common channel;

generating a spreading code based on the spreading code information upon receipt of a response message for the control message; and despreading the reverse common channel message by the generated spreading code.

32. The device of claim 22, wherein the mobile station further has a message generator for generating a message requesting assignment of a spreading code to spread a reverse common channel message when the mobile station is to send the reverse common channel message.

33. The device of claim 32, wherein the spreading code generator generates the spreading code using a public long code.

34. The device of claim 22, wherein the control message generator generates a control message including information representative of a spreading code to spread a response message on a reverse common channel when the base station needs a rapid response to a forward common channel message from the mobile station.

35. The device of claim 34, wherein the spreading code information is an access channel number, the spreading code generator generates the spreading code using an access channel long code mask corresponding to the access channel number, and the base station does not assign the same access channel number to a different mobile station while the mobile station uses the access channel number, to prevent message contention between the mobile stations.

36. The device of claim 34, wherein the spreading code information is a specific long code ID prepared to prevent message contention, and the spreading code generator generates the spreading code using a long code corresponding to the long code ID.

37. A common channel message communicating method in a base station of a CDMA communication system, comprising the steps of:

generating a control message including information representative of a spreading code for spreading a reverse common channel message; and transmitting the control message on a forward common channel, wherein the reverse common channel message is sent to the base station in predetermined time intervals.

38. The method of claim 37, wherein the spreading code information is used for a mobile station exclusively to communicate with the base station when the mobile station spreads the reverse common channel message.

39. The method of claim 38, wherein the spreading code information is an access channel number.

40. The method of claim 39, wherein while the mobile station uses an access channel long code mask corresponding to the access channel number, the base station does not assign the same access channel number to a different mobile station, to prevent message contention between the mobile stations.

41. The method of claim 38, wherein the spreading code information represents use of a public long code generated with use of the ESN of the mobile station.

42. The method of claim 38, wherein the spreading code information is a specific long code ID prepared to prevent message contention.

43. The method of claim 42, further comprising the step of causing the base station not to assign the same long code ID to a different mobile station while the mobile station uses an access channel long code mask corresponding to the specific long code ID, to prevent message contention between the mobile stations.

44. The method of one of claims 39 to 43, wherein the control message further includes information representative of a maximum duration of the spreading code.

45. The method of claim 44, wherein the reverse common channel message is an access channel message.

46. The device of claim 44, wherein the reverse common channel message is a reverse common control channel message.

47. The method of claim 37, further comprising the step of receiving a message on a reverse common channel, generating a spreading code based on the spreading code information upon receipt of a response message for the control message, and despreading the reverse common channel message by the generated spreading code.

48. A common channel message communicating method in a mobile station of a CDMA communication system, comprising the steps of:
analysing information representative of an assigned spreading code included in a control message received on a forward common channel;
generating a spreading code based on the spreading code information; and
spreading a reverse common channel message by the spreading code and transmitting the spread reverse common channel message,
wherein the reverse common channel message is sent to the base station in predetermined time intervals.

49. The method of claim 48, wherein the spreading code information is used for the mobile station exclusively to communicate with a base station when the mobile station spreads the reverse common channel message.

50. The method of claim 49, wherein the spreading code information is an access channel number, and the spreading code is generated using an access channel long code mask corresponding to the access channel number.

51. The method of claim 49, wherein while the spreading code information indicates use of a public long code mask generated with use of the ESN of the mobile station.

52. The method of claim 49, wherein the spreading code information is a specific long code ID prepared to prevent message contention, and the spreading code is generated using a long code corresponding to the long code ID.

53. The method of one of claims 50, 51, and 52, wherein the control message further includes information representative of a maximum duration of the spreading code.

54. The method of claim 53, wherein the reverse common channel message is an access channel message.

55. The method of claim 53, wherein the reverse common channel message is a reverse common control channel message.

56. The method of claim 48, further comprising the step of generating a message requesting assignment of a spreading code to spread a reverse common channel message when the mobile station is to send the reverse common channel message.

57. The method of claim 56, wherein the spreading code is generated using a public long code.

58. A common channel message communicating method in a CDMA communication system, comprising the steps of:
causing a base station to generate a control message including information representative of a spreading code for spreading a reverse common channel message;
causing the base station to transmit the control message on a forward common channel;
causing a mobile station to analyse the information representative of an assigned spreading code included in the control message received on the forward common channel;
causing the mobile station to generate a spreading code based on the spreading code information; and
causing the mobile station to spread the reverse common channel message by the spreading code and transmit the spread reverse common channel message,
wherein the reverse common channel message is sent to the base station in predetermined time intervals.

59. The method of claim 58, wherein the spreading code information is used for the mobile station exclusively to communicate with the base station when the mobile station spreads the reverse common channel message.

60. The method of claim 59, wherein the spreading code information is an access channel number.

61. The method of claim 60, further comprising the step of causing the base station not to assign the same access channel number to a different mobile station while the mobile station uses the access channel number.

62. The method of claim 59, wherein the spreading code information represents use of a public long code generated with use of the ESN of the mobile station.

63. The method of claim 59, wherein the spreading code information is a specific long code ID prepared to prevent message contention.

64. The method of one of claims 60 to 63, wherein the control message further includes information representative of a maximum duration of the spreading code.

65. The method of claim 64, wherein the reverse common channel message is an access channel message.

66. The method of claim 64, wherein the reverse common channel message is a reverse common control channel message.

67. The method of claim 58, further comprising the step of causing the base station to receive a message on a reverse common channel, generate a spreading code based on the spreading code information upon receipt of a response message for the control message, and despread the reverse common channel message by the generated spreading code.

68. The method of claim 58, further comprising the step of causing the mobile station to generate a message requesting assignment of a spreading code to spread a reverse common channel message when the mobile station is to send the reverse common channel message.

69. The method of claim 68, wherein the spreading code is generated using a public long code.

70. The method of claim 58, wherein a control message is generated which includes information representative of a spreading code to spread a response message on a reverse common channel when the base station needs a rapid response to a forward common channel message from the mobile station.

71. The method of claim 70, wherein the spreading code information is an access channel number, the spreading code is generated using an access channel long code mask corresponding to the access channel number, and the base station does not assign the same access channel number to a different mobile station while the mobile station uses the access channel number, to prevent message contention between the mobile stations.

72. The method of claim 70, wherein the spreading code information is a specific long code ID prepared to prevent message contention, and the spreading code is generated using a long code corresponding to the long code ID.

* * * * *